United States Patent
Dai et al.

(10) Patent No.: US 12,213,093 B2
(45) Date of Patent: Jan. 28, 2025

(54) SYSTEM AND METHOD FOR USING A TIME GAP

(71) Applicant: ZTE CORPORATION, Guangdong (CN)

(72) Inventors: Jianqiang Dai, Shenzhen (CN); Nan Zhang, Shenzhen (CN); Jianwu Dou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 372 days.

(21) Appl. No.: 17/679,889

(22) Filed: Feb. 24, 2022

(65) Prior Publication Data

US 2022/0182961 A1 Jun. 9, 2022

Related U.S. Application Data

(63) Continuation of application No. PCT/CN2020/088935, filed on May 7, 2020.

(51) Int. Cl.
*H04W 56/00* (2009.01)
*H04L 5/00* (2006.01)

(52) U.S. Cl.
CPC ....... *H04W 56/0045* (2013.01); *H04L 5/0048* (2013.01)

(58) Field of Classification Search
CPC . H04W 56/0045; H04W 72/23; H04W 84/06; H04L 5/0048
See application file for complete search history.

(56) References Cited

U.S. PATENT DOCUMENTS

| | | | |
|---|---|---|---|
| 2014/0254442 A1 | 9/2014 | Yang et al. | |
| 2017/0142674 A1* | 5/2017 | Centonza | H04W 56/0025 |
| 2018/0145819 A1* | 5/2018 | Axmon | H04W 56/005 |
| 2019/0200309 A1* | 6/2019 | Zeng | H04W 76/14 |
| 2022/0070809 A1* | 3/2022 | Song | H04W 72/0446 |
| 2023/0216580 A1* | 7/2023 | Qaise | H04B 7/18504 |
| | | | 370/326 |

FOREIGN PATENT DOCUMENTS

| | | |
|---|---|---|
| CN | 102055705 A | 5/2011 |
| CN | 102238721 A | 11/2011 |

(Continued)

OTHER PUBLICATIONS

Extended European Search Report for EP Appl. No. 20896711.7, dated Aug. 5, 2022 (8 pages).

(Continued)

*Primary Examiner* — The Hy Nguyen
*Assistant Examiner* — Adam Joel Cerlanek
(74) *Attorney, Agent, or Firm* — Foley & Lardner LLP

(57) ABSTRACT

A method for enhanced uplink compensation gap are disclosed herein. In one embodiment, the method is configured to insert, by a wireless communication device, a time gap between a first transmission and a second transmission according to a configuration from a wireless communication node, wherein the first transmission includes the wireless communication device transmitting a plurality of first uplink messages to the wireless communication node and the second transmission includes the wireless communication device transmitting a plurality of second uplink messages to the wireless communication node.

19 Claims, 4 Drawing Sheets

(56) References Cited

FOREIGN PATENT DOCUMENTS

| | | |
|---|---|---|
| CN | 102932903 A | 2/2013 |
| CN | 103430467 A | 12/2013 |
| CN | 105871495 A | 8/2016 |
| CN | 106576343 A | 4/2017 |
| CN | 110891316 A | 3/2020 |
| CN | 111064539 A | 4/2020 |
| CN | 111342888 A | 6/2020 |
| EP | 3 176 962 A1 | 6/2017 |
| WO | WO-2017/140681 A1 | 8/2017 |
| WO | WO-2019/027242 A1 | 2/2019 |

OTHER PUBLICATIONS

International Search Report and Written Opinion for PCT Appl. No. PCT/CN2020/088935 mailed Feb. 5, 2021 (8 pages).
Sony: "On early uplink early termination of PUSCH repetitions" 3GPP TSG RAN WG1 Meeting #89; R1-1708248; May 19, 2017; Hangzhou, P.R. China (4 pages).
Sony: "Transmission in preconfigured UL resources" 3GPP TSG RAN WG1 Meeting #94; R1-1808348; Aug. 24, 2018; Gothenburg, Sweden (4 Pages).
First Office Action for CN Appl. No. 202080095602.3, dated Jul. 22, 2024 (with English translation, 26 pages).

\* cited by examiner

A UE inserts a time gap between a first transmission and a second transmission according to a configuration from a wireless node
601

A wireless node determines a time gap to be inserted between a first transmission and a second transmission based on a navigation signal
701

SYSTEM AND METHOD FOR USING A TIME GAP

CROSS-REFERENCE TO RELATED APPLICATIONS

This application claims the benefit of priority under 35 U.S.C. § 120 as a continuation of PCT Patent Application No. PCT/CN2020/088935, filed on May 7, 2020, the disclosure of which is incorporated herein by reference in its entirety.

TECHNICAL FIELD

The disclosure relates generally to wireless communications and, more particularly, to systems and methods for enhanced uplink compensation gap.

BACKGROUND

Crystal oscillators may be used in generating frequencies, clock signal in user equipment ("UE"). If the UE is a low-cost UE, crystal oscillator frequency error may be highly likely. An example of a frequency error may be 1 ppm. Crystal oscillator frequency errors may also be caused by alterations in temperature or aging components.

Even after devices are synchronized, there may still be a frequency error due to accuracy of crystal oscillators. This remaining frequency error after the synchronization period may be called the initial frequency offset. Over time, the frequency offset may increase to a value which is not acceptable for the system performance. In some embodiments, the maximum frequency error may be not much more than 0.15 ppm. In other embodiments, the maximum frequency error may be not much more than 0.25 ppm. In other embodiments, the maximum frequency error may be not much more than 0.45 ppm.

Different networks may have varying degrees of frequency errors. For example, non-terrestrial networks ("NTN") inherently have longer round trip times and longer uplink transmission signals for internet of things user equipment devices, which may result in a frequency error increasing over time that may seriously degrade communication performance.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication device includes inserting, by a wireless communication device, a time gap between a first transmission and a second transmission according to a configuration from a wireless communication node, wherein the first transmission includes the wireless communication device transmitting a plurality of first uplink messages to the wireless communication node and the second transmission includes the wireless communication device transmitting a plurality of second uplink messages to the wireless communication node.

In another embodiment, a method performed by a wireless communication node includes determining, by a wireless communication node, a time gap to be inserted between a first transmission and a second transmission based on a navigation signal, wherein the first transmission includes a wireless communication device transmitting a plurality of first uplink messages to the wireless communication node and the second transmission includes the wireless communication device transmitting a plurality of second uplink messages to the wireless communication node.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
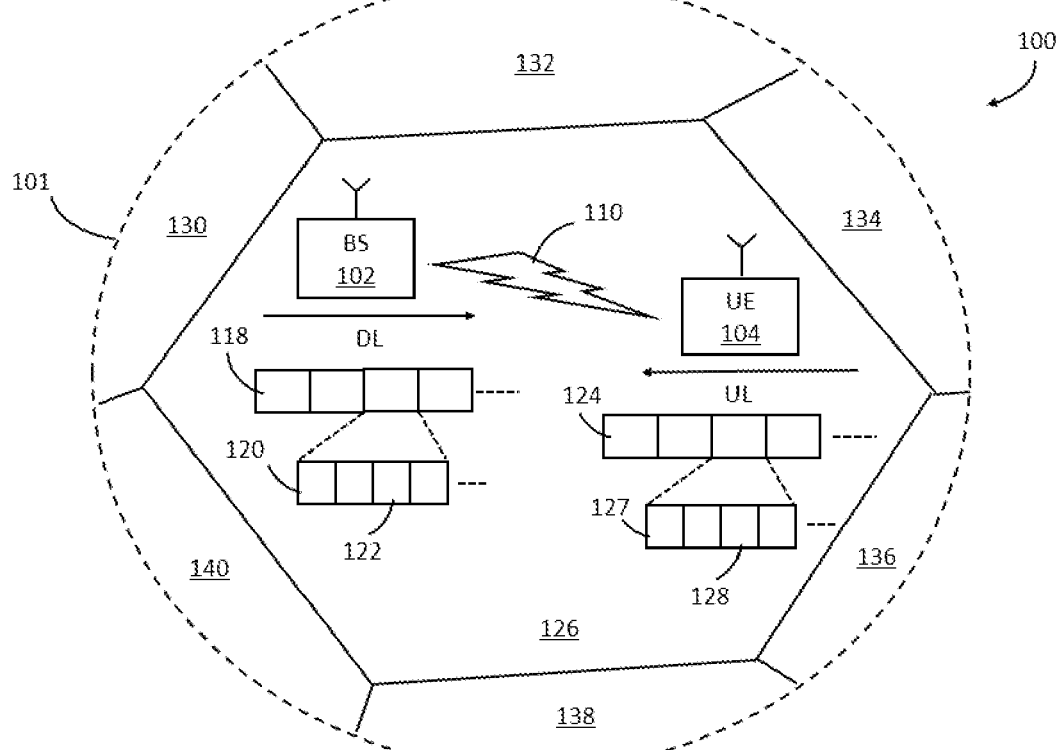
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
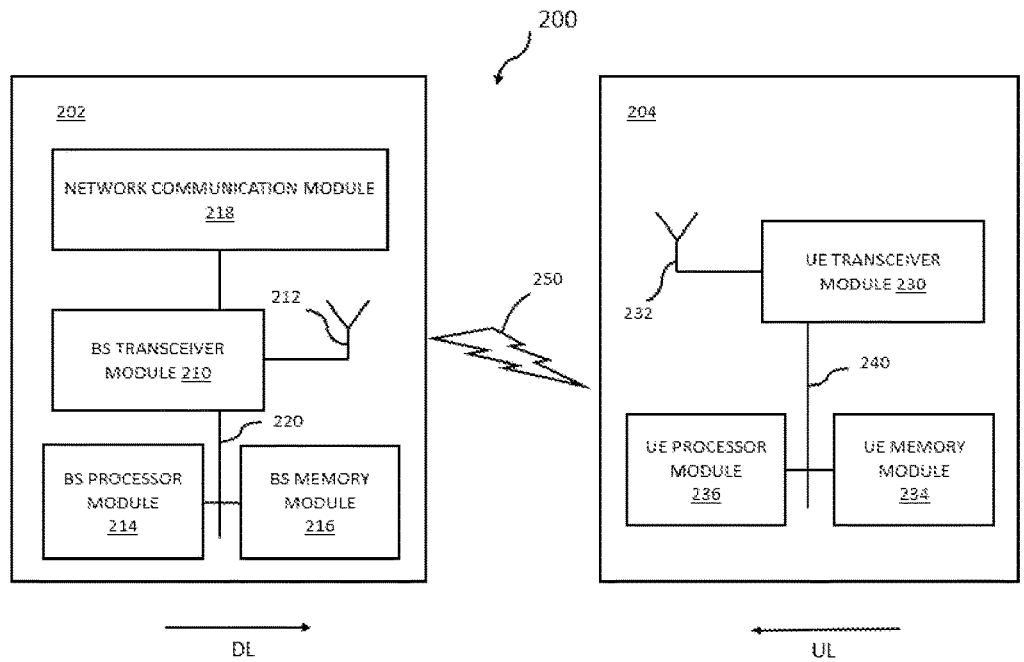
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

When devices communicate via half-duplex frequency-division duplexing ("HD FDD"), the device may not transmit and receive simultaneously. Examples of these devices may include low-cost narrow band devices that connect to the internet, in other words, narrow band Internet of Things devices ("NB-IoT"). In areas where there is weak terrestrial network service or no terrestrial network service, an NTN network may be employed to support connectivity of massive IoT devices. NTNs such as Geostationary Earth Orbit ("GEO") satellites can provide continental local or regional services. However, special considerations must be made when using NTN networks.

The fast movement of satellites can lead to Doppler frequency shifting. Further, the distance of a satellite from terrestrial wireless communication devices can result in large transmission round trip times.

The transmissions to the GEO satellite can be very lengthy, caused by the necessity to repeat the transmission various times. If a UE uses an NTN for communication, for example, when there is a weak terrestrial network service or no terrestrial network service, a frequency error above a certain threshold may seriously degrade communication performance.

Figure 3:
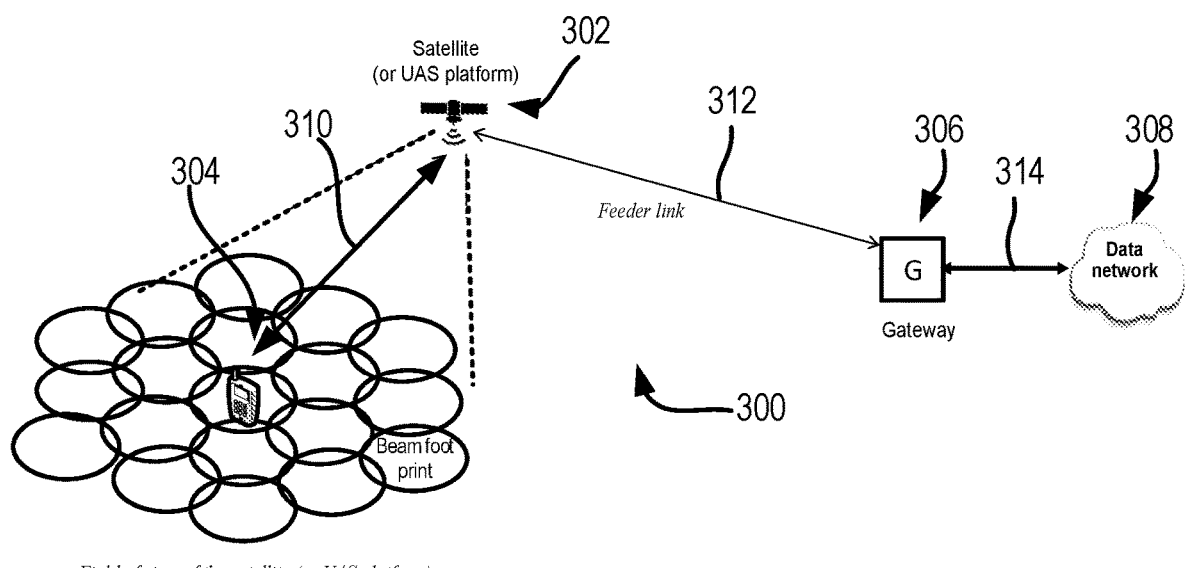
FIG. 3 shows a block diagram of an example non-terrestrial communication network.

FIG. 3 shows a block diagram of an example non-terrestrial communication network 300 including at least one unmanned aerial system based wireless communication nodes. In particular, FIG. 3 shows a communication network 300 including a satellite or an unmanned aerial vehicle (UAV) 302, UE 304, a gateway 306 and a data network 308. The satellite 302 can serve as a platform for a base station, such as, for example, the BS 102 and 202 discussed above in relation to FIGS. 1 and 2, and the UE 304 can be similar to the UE 104 and 204 discussed above in relation to FIGS. 1 and 2. The UE 304 and the BS on the satellite 302 can communicate over a communication link 310, and the BS on the satellite 302 and the gateway 306 can communicate over a feeder link 312. The gateway 306 can communicate with the data network 308 over a data link 314.

Figure 4:
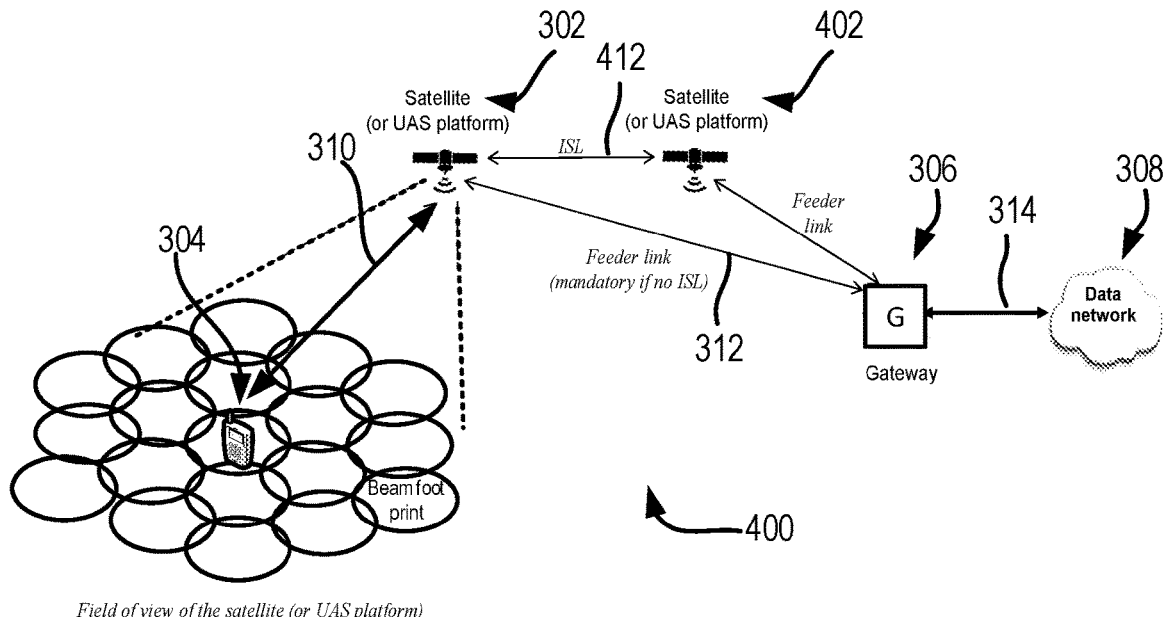
FIG. 4 shows a block diagram of an example non-terrestrial communication network.

FIG. 4 shows another example non-terrestrial communication network 400 including at least one unmanned aerial system based wireless communication nodes. The communication network 400 shown in FIG. 4 is similar to the communication network 300 shown in FIG. 3, but include an additional satellite or UAV platform 402. FIG. 4 depicts the scenario where the communication network includes a constellation of satellites that allow communication between the UE and the gateway or data network.

The gateway can be one of several gateways that can provide connectivity between satellite 302/402 and the data network 308, which can be a public terrestrial data network. The gateways can be deployed across the satellite's targeted coverage area, which can include regional or continental coverage area. In examples where the satellite is a non-geostationary earth orbit satellite ("non-GEO satellite"), the satellite can be served successively by one or several gateways at a time. The communication network can ensure that there is the service link and the feeder link continuity is maintained between successive gateways with sufficient time duration to proceed with mobility anchoring and handover. In some examples, the UE in a cell may be served by only one gateway.

The satellite can implement either a transparent or a regenerative (with on-board processing) payload. The satellite can generate several beams over a service area that can be bounded by its field of view, which can depend on the on-board antenna characteristics and a minimum elevation angle of the satellite. The footprints of the beams on the surface of the earth can be elliptical in shape. In instances where the satellite implements transparent payload, the satellite may carry out radio filtering, frequency conversion, and amplification, thereby repeating the signals. In instances where the satellite platform implements regenerative payload, the satellite can carry out radio frequency filtering, frequency conversion, amplification, as well as demodulation/modulation, switching and/or routing, coding/modulation, etc., effectively carrying out functions, at least in part, of a base station on-board the satellite.

In instances where the communication system includes a constellation of satellites, such as for example, the communication system shown in FIG. 4, the network can include an inter-satellite link (ISL) 412. In some such instances, the satellites can implement regenerative payload. The ISL can may operate in RF or in optical frequency bands.

Table 1 below lists various types of satellites that can be used to implement the satellite/UAV 302 and 402 shown in FIGS. 3 and 4. The types of satellites and the corresponding information shown in Table 1 are only examples and are not limiting, as other types of platforms and satellites can also be utilized.

TABLE 1

| Platforms | Altitude range | Orbit | Typical beam footprint size |
|---|---|---|---|
| Low-Earth Orbit (LEO) satellite | 300-1500 km | Circular around the earth | 100-500 km |
| Medium-Earth Orbit (MEO) satellite | 7000-25000 km | | 100-500 km |
| Geostationary Earth Orbit (GEO) satellite | 35 786 km | notional station keeping position fixed in terms of elevation/azimuth with respect to a given earth point | 200-1000 km |
| UAS platform (including HAPS) | 8-50 km (20 km for HAPS) | | 5-200 km |
| High Elliptical Orbit (HEO) satellite | 400-50000 km | Elliptical around the earth | 200-1000 km |

In some embodiments, GEO satellite and UAS platforms can be used to provide continental, regional, or local service. In some embodiments, a constellation of LEO and MEO satellites can be used to provide services in both northern and southern hemispheres. In some instances, constellation of satellites can even provide global coverage including the polar regions. In some such instances, appropriate orbit inclination, ISLs and beams can be selected.

Figure 5:
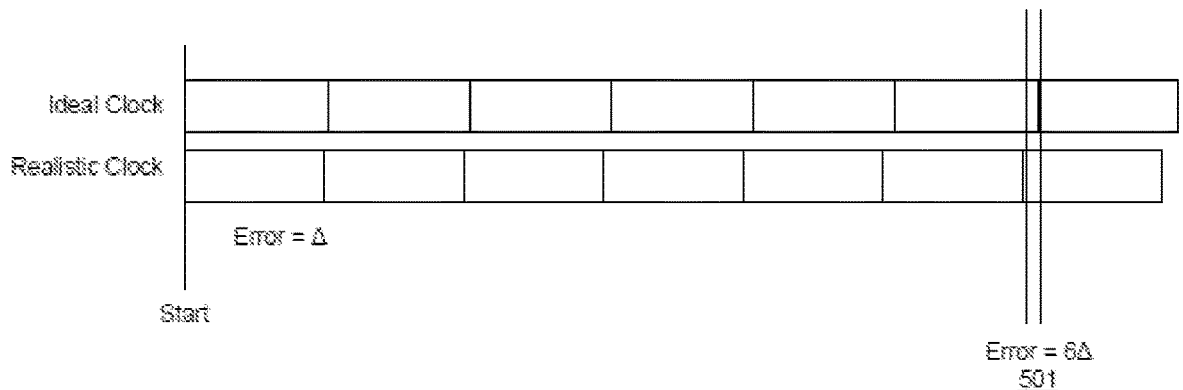
FIG. 5 illustrates a diagram of a realistic clock compared to an ideal clock.

FIG. 5 is an example diagram of an ideal clock compared to a realistic clock. At 501, an error of 6Δ is observed. This error suggests that some devices, like NB-IoT devices, will have a frequency error caused by a realistic crystal oscillator as opposed to an ideal crystal oscillator.

As described above, crystal oscillator frequency errors that pass an error threshold in NTNs may seriously degrade performance. Thus, an enhanced uplink ("UL") compensation gap design may solve the issue of the UE crystal oscillator frequency error in NTN network deployment. The error caused by the imperfect crystal oscillator may be accounted for by the implementation of a UL compensation gap.

Figures 6, 7, 8:
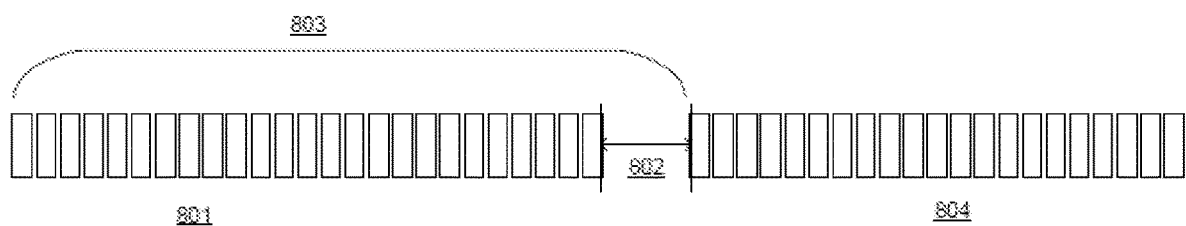
FIG. 6 illustrates a flow chart of an example method of a UE inserting a UL gap to correct the frequency error.
FIG. 7 illustrates a flow chart of an example method of a wireless node configuring a time gap to be inserted into a UL gap.
FIG. 8 illustrates a diagram of a UL gap between two continuous transmissions sent by a UE, wherein the UE performs frequency error compensation during the UL gap, in accordance with some embodiments of the present disclosure.

FIG. 6 illustrates a flow chart of an example method of a UE inserting a UL gap to correct the frequency error. As described in 601, a UE may insert a UL time gap between a first transmission and a second transmission. The UE's behavior during the UL gap, to correct the frequency error, varies according to the UEs capabilities.

FIG. 7 illustrates a flow chart of an example method of a wireless node configuring a time gap to be inserted into a UL gap. As discussed further below, a time gap may be used to correct the frequency error between a UE device and a wireless node in an NTN network.

FIG. 8 is a diagram of a UL gap between two continuous transmissions sent by a UE, wherein the UE performs frequency error compensation during the UL gap, in accordance with some embodiments of the present disclosure.

To compensate for the frequency offset, a UE may insert a UL gap between UL transmissions. The UL gap may be determined by a node. In some embodiments, the node, for example a base station, may determine the UL gap based on a navigation signal. The UE, at the end of a maximum continuous UL transmission, may insert the UL gap after a first UL transmission. This time gap may separate UL messages in the first transmission from UL messages in the second transmission.

In some embodiments, the duration of the first transmission may be determined by monitoring a frequency offset and evaluating whether the frequency offset satisfies a threshold. In alternate embodiments, the duration of the first transmission may be determined by monitoring a timing offset and evaluating whether the timing offset satisfies a threshold.

In some embodiments, the threshold is a fixed value. Thus, the duration of the first transmission is a fixed value. In other embodiments, the threshold may be determined based on an evaluation. The frequency offset may be evaluated through an analysis of a frequency drift rate, or other predictor models that may be used to calculate a frequency offset.

At 801, the UE is shown transmitting a UL signal of length x-subframes. Transmissions to satellites are lengthy because they are repetitive.

In addition, UL transmissions are sparse and unpredictable. At the end of a UL transmission of x-subframes, a gap is inserted before the next UL transmission of x-subframes begins. The UL gap is shown by 802. In some embodiments, the gap is inserted immediately after the first transmission. The length of the time gap may be one or more symbols, one or more slots, one or more subframes, one or more milliseconds, or one or more of the period of a navigation signal.

In some embodiments, the UL gap may be determined based on an amount of frequency offsets and at least one or more DL resources and one or more GNSS resources. In some embodiments, the UL gap may be based on subcarrier spacing of at least one of the first transmission or the second transmission. In some embodiments, the UL gap is a fixed length and may include various cases: the time offset between the UE sending the Physical Random Access Channel ("PRACH") and the UE sending Physical Uplink Shared Channel ("PUSCH"), the time offset between the PRACH and corresponding PUSCH can be included in UL gap; the time offset between the UE sending the PRACH in one UL transmission to the time the UE sends the PRACH in another UL transmission; the time offset between the UE sending a first message in one UL transmission to the time the UE sends the PUSCH in another UL transmission, wherein the first message contains PRACH, PUSCH and a time offset between PRACH and PUSCH; the time offset between the UE sending the PUSCH in one UL transmission to the time the UE sends the PUSCH in another UL transmission. When the UL gap is defined to include these time offsets, the UE's behavior is constrained such that the UE compensates for the frequency error during the UL gap. Consequently, each of the first transmission and second transmission may include at least one of PUSCH or PRACH.

The UL time gap length may determine the available downlink ("DL") resources, such as the narrowband reference signal ("NRS"), and the synchronization signal. For example, a UE may estimate and measure what DL resources it needs. Thus, a larger compensation gap may mean that the UE estimates that it needs more resources than it actually needs for transmission. Thus, it is advantageous for the compensation gap to be as fine-tuned as possible.

The UE may behave differently, with respect to what the UE does during the UL gap, depending on the capability type of the UE. During the UL gap, the UE may receive at least one of a navigation signal or a plurality of DL messages. The received DL messages may be transmitted from a wireless access node. In a NTN system, the navigation signal may be transmitted by a satellite. In some embodiments, the navigation signal may be a non-terrestrial network signal.

During the UL gap, the UE uses the received resources to determine a value that corrects the frequency error. The value may be a timing adjustment value or a frequency adjustment value. That value, which adjusts the timing or frequency of the UE, is applied during the second transmission.

As discussed above, a wireless node may configure the UL gap. The wireless node may transmit the configuration information to the UE before the UE's first transmission. The wireless node may determine the UL gap configuration based on the capability of the UE and the capability information reported by UE. For example, if the UE has an NTN module, for example a GNSS module, the wireless node may determine to configure the UL gap such that the UE may correct the frequency error using a signal from a satellite and received by the GNSS module, as discussed further below.

In some embodiments, the UL gap configuration may be indicated to the UE via high layer signaling. For example, the wireless node, or base station, may insert the UL gap configuration information into Radio Resource Control ("RRC") messages and Medium Access Control ("MAC") control elements. In other words, high layer signals refer to message that are transmitted that control terminals in the MAC layer. The configuration information of the UL gap may include at least one of a time domain length of the time gap and a periodicity of the time gap.

In other embodiments, there may be a default UL configuration such that the UL gap is a fixed value. For example, the node may determine a UL gap of 256 ms. In other embodiments, the gap may be configured to be inserted after a certain period of time. For example, the period of the gap, $P_{Gap}$ may be configured for 160 ms, 256 ms or 1024 ms. In circumstances where the gap is defined to be periodic, the periodicity of the gap includes the UL transmission. For example, the periodicity of the gap and the first UL transmission is shown by 803.

At 804, more UL messages may be transmitted during a second transmission. In some embodiments, messages in first UL transmission may be transmitted again because of the repetitive nature of transmitting via an NTN network.

The UE may transmit UL messages, insert a periodic UL gap to perform frequency corrections, and subsequently transmit more UL messages. In some embodiments, the subsequent transmission occurs right after the UL gap. In other embodiments, subsequent transmissions occur some time periods after the UL gap.

User Equipment Configured with Non-Terrestrial Network Module to Correct Frequency Error During Uplink Gap The UE may receive a navigation signal based on the capability type of the UE. For example, if the UE has an NTN module, the UE may be capable of receiving a navigation signal. The navigation signal may, for example, be a Global Navigation Satellite System (GNSS) signal.

In some embodiments, a Low-Earth Orbit ("LEO") satellite may be communicated with. LEO satellites are faster than GEO satellites, meaning the beam directed to the UE changes more frequently to account for the updated LEO position. Thus, the UE and the LEO satellite may need more frequent DL synchronization.

In other embodiments, during the UL gap, the frequency error can be compensated while communicating with NTN networks through the assistance of a navigation signal, for example a GNSS signal. The assistance provided for by the GNSS signal may save power and improve resource utilization efficiency.

The GNSS signal may be used to help the UE determine the frequency error or correct the frequency to a reasonable range during the UL gap. The UE may contain a GNSS module that may estimate the crystal oscillator's frequency error via a received periodic GNSS signal. During the UL gap, when the UE device is not transmitting, the UE may receive and process several periods of a GNSS signals to measure the frequency error. In other words, the length of the time gap may be $N \times T_{measure}$. N is an integer that depends on the range of the accumulated frequency drift and the capabilities in the UE. $T_{measure}$ is the measurement period. In some embodiments, $T_{measure}$ may be the period of the GNSS signal. Thus, the GNSS signal may be used by the UE to determine a frequency offset amount.

In some embodiments, during the UL gap, the frequency error can be compensated for in NTN networks through the assistance of a GNSS signal in addition to using one or more DL messages. The DL messages may include at least one of system information, a synchronization signal, a cell-specific reference signal, or a channel state information reference signal ("CSI-RS"). As described above, devices communicating via HD FDD, most NB-IoT devices, may not transmit and receive at the same time. Thus, for single carrier deployment, the UE may need to switch between carrier signals when it needs to transmit via UL and receive via DL. When the UE switches to a dedicated DL carrier, DL synchronization between the devices may be re-tuned. A synchronization signal and reference signal may be transmitted. The GNSS signal may improve the accuracy of the estimation of the frequency error and shorten the UL compensation gap because the GNSS signal is used and less DL resources are used. At the end of the UL gap, the UE may switch to UL transmission with the frequency correction.

In some embodiments, the UE may detect an absence of a navigation signal during the UL gap. In these circumstances, during the UL gap, the UE may switch to receive DL messages, the messages transmitted from the node.

In the embodiments described above where the UE may switch to a dedicated DL carrier and subsequently switch back to a dedicated UL carrier. In some embodiments, during the UL gap, the UE device may cease transmitting and receive and process DL messages. The UE may use the GNSS signal to measure an amount of frequency offsets and subsequently determine a frequency error. In other embodiments, concurrently with ceasing the first transmission, the UE device may switch to receive DL messages. During the UL gap, the UE may measure an amount of frequency offsets using at least one of the navigation signal or the DL messages.

The length of the UL gap may be determined, by a wireless communication node, to be $N \times T_{measure}$, where N is an integer that depends on the range of the accumulated frequency drift and GNSS module in the UE and $T_{measure}$ is the measurement period. In some embodiments, $T_{measure}$ may be the period of the GNSS signal. In other embodiments, $T_{measure}$ may be the period of the DL signal. In alternate embodiments, $T_{measure}$ may be the period of both the GNSS signal and DL signal.

In other embodiments, the GNSS signal may be lost or interrupted. There may be a failed detection when the UE attempts to process the GNSS signal during the UL gap. A resolution mechanism may occur when the UE loses the GNSS signal.

One resolution mechanism may include the UE trying to recover the GNSS connection during a time period as long as the UL gap, as described above. In other words, the UE may determine the absence of the navigation signal and attempt to establish a connection to receive the navigation signal for a period of time less than or equal to the UL gap. An alternate resolution mechanism may include the UE switching to a dedicated DL carrier in an attempt to receive a DL signal. As described above, the UE is capable of performing frequency error correction using only a DL signal.

In some embodiments, the UE may fail to synchronize with the node it is attempting to receive the DL messages. Subsequently, the UE may be unable to measure the DL messages to correct the frequency error. In these circumstances, the UE may retry to synchronize with the transmitting node during the UL gap. In some embodiments, the time to synchronize with the transmitting node may exceed the UL gap. In other words, the UE may continue attempting to synchronize with the transmitting node until the UE receives the DL messages. In alternate embodiments, the time to synchronize with the second device may occur during the UL gap. In other words, the time to synchronize with the second device may take longer than the UL gap. In these circumstances, the UE may continue attempting to synchronize with the second device, even if the synchronization time is longer than the UL gap. Upon synchronization and subsequent receipt of the DL messages, the UE may correct its frequency error and continue transmitting to the NTN network.

User Equipment Configured without GNSS Module to Correct Frequency Error During Uplink Gap In some embodiments, the UE may not have a GNSS module. Examples of these devices may be NB-IoT devices. In these circumstances, the UE may perform different functions to compensate for the frequency error or correct the frequency to a reasonable range. In other words, the UE may perform periodic frequency error correction in the UL compensation gap, where the UL compensation gap occurs before the last symbol of a transmission of x-subframes. The length of the UL compensation gap is based on the subcarrier spacing of the UL transmission.

In some embodiments, during the UL gap, the frequency error can be corrected in NTN networks by taking into account the temperature changes. As described above, temperature variations may cause the crystal oscillator to output an imperfect frequency. Thus, by taking into account the temperature variations between the UE and the second device, the UE can correct the frequency error.

In some embodiments, the UE may switch to a dedicated DL carrier, during the UL gap, in an attempt to receive DL messages and measure the frequency error. The UE may interrupt its UL transmission to compensate for the frequency error or correct the frequency error to a reasonable range.

As described above, the UE is capable of performing frequency error correction using only a DL signal. The UE may need to switch carrier signals from a UL carrier to a DL carrier. When the UE switches to a dedicated DL carrier, DL synchronization between the device and node should be re-tuned. The DL signal may include at least one of system information, a synchronization signal, or a cell-specific reference. A UE may switch to DL for frequency error correction during the gap, and then switch back to UL for a continuous UL transmission.

User Equipment Corrects Frequency Error without Uplink Gap

In some embodiments, the UE may correct for the frequency error that occurs while communicating in NTN networks by implementing a temperature compensated crystal oscillator. As described above, temperature variations may cause the crystal oscillator to output an imperfect frequency. Thus, by implementing a temperature compensated crystal oscillator, the UE can correct the frequency error.

Base Station Corrects Frequency Error by Configuring Gap

In some embodiments, a base station may configure a time gap, between two DL transmissions. The first transmission may last for a first period of time. The first period of time may be determined by evaluating when an amount of frequency offsets at a UE receiver satisfies a threshold. In one embodiment, for a class of UE capability, defined by whether or not the UE supports a GNSS or other NTN module, the threshold is a fixed value. Correspondingly, the duration of the first period of time is configured as a fixed value.

A base station may inform the UE the configuration of the time gap. The gap configuration information may be transmitted before the first transmission. In another embodiment, for a class of UE capability, there may be a default configuration of time gap. i.e., the duration of the time gap is a fixed value.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
receiving, by a wireless communication device from a wireless communication node, a configuration indicating a time gap determined by the wireless communication node based on a navigation signal;
inserting, by the wireless communication device, the time gap determined based on the navigation signal, between a first transmission and a second transmission according to the configuration from the wireless communication node,
wherein the first transmission includes the wireless communication device transmitting a plurality of first uplink messages to the wireless communication node and the second transmission includes the wireless communication device transmitting a plurality of second uplink messages to the wireless communication node;
receiving, by the wireless communication device during the time gap, the navigation signal; and
determining, by the wireless communication device during the time gap, a value for timing adjustment or a value for frequency adjustment based on the navigation signal.

2. The wireless communication method of claim 1, wherein the time gap is in a unit of at least one of: a symbol, a slot, a subframe, one or more milliseconds, or a periodicity of the navigation signal.

3. The wireless communication method of claim 1, receiving, by the wireless communication device during the time gap, a plurality of downlink messages.

4. The wireless communication method of claim 3, wherein the plurality of downlink messages include at least one of: system information, a synchronization signal, a cell-specific reference signal or a channel state information reference signal (CSI-RS).

5. The wireless communication method of claim 3, further comprising:
   determining, by the wireless communication device during the time gap, an absence of the navigation signal; and
   switching, by the wireless communication device during the time gap, to receive the plurality of downlink messages from the wireless communication node.

6. The wireless communication method of claim 5, further comprising:
   subsequently to the switch, determining, by the wireless communication device during the time gap, failure to synchronize with the wireless communication node; and
   continuing, by the wireless communication device during the time gap, the synchronization with the wireless communication node.

7. The wireless communication method of claim 5, further comprising:
   subsequently to the switch, determining, by the wireless communication device during the time gap, failure to synchronize with the wireless communication node; and
   continuing, by the wireless communication device, the synchronization with the wireless communication node after the time gap lapses.

8. The wireless communication method of claim 1, applying, by the wireless communication device, the value for timing adjustment or the value for frequency adjustment on the second transmission.

9. The wireless communication method of claim 1, further comprising:
   ceasing, by the wireless communication device during the time gap, receiving any downlink messages from the wireless communication node; and
   measuring, by the wireless communication device during the time gap, an amount of frequency offsets using the navigation signal.

10. The wireless communication method of claim 1, further comprising:
    ceasing, by the wireless communication device during the time gap, the first transmission; and
    measuring, by the wireless communication device during the time gap, an amount of frequency offsets using the navigation signal.

11. The wireless communication method of claim 1, wherein each of the first transmission and the second transmission includes at least one of: a Physical Uplink Shared Channel (PUSCH) or a Physical Random Access Channel (PRACH).

12. The wireless communication method of claim 1, further comprising:
    determining, by the wireless communication device, to transmit a plurality of subsequent uplink messages; and
    periodically inserting, by the wireless communication device, responsive to determining to transmit the plurality of subsequent uplink messages, the time gap right after a respective period of time for which the wireless communication device transmits each of the plurality of subsequent uplink messages.

13. The wireless communication method of claim 1, further comprising:
    concurrently with ceasing the first transmission, switching, by the wireless communication device, to receive a plurality of downlink messages from the wireless communication node; and
    measuring, by the wireless communication device during the time gap, an amount of frequency offsets using at least one of the navigation signal or the plurality of downlink messages.

14. The wireless communication method of claim 1, further comprising:
    determining, by the wireless communication device during the time gap, an absence of the navigation signal; and
    establishing, by the wireless communication device during the time gap, a connection to receive the navigation signal for a period of time, wherein the period of time is less than or equal to the time gap.

15. A wireless communication method, comprising:
    determining, by a wireless communication node, a time gap to be inserted between a first transmission and a second transmission based on a navigation signal,
    wherein the first transmission includes a wireless communication device transmitting a plurality of first uplink messages to the wireless communication node and the second transmission includes the wireless communication device transmitting a plurality of second uplink messages to the wireless communication node; and
    transmitting, by the wireless communication node to the wireless communication device, a configuration indicating the time gap determined based on the navigation signal;
    wherein during the time gap, the wireless communication device receives the navigation signal and determines a value for timing adjustment or a value for frequency adjustment based on the navigation signal.

16. The wireless communication method of claim 15, wherein the first transmission lasts for a first period of time, the wireless communication method further comprising:
    determining, by the wireless communication node, the first period of time by determining that at least one of an amount of frequency offset, and an amount of a timing offset, satisfies a threshold.

17. The wireless communication method of claim 15, wherein the wireless communication node indicates the configuration of the time gap via high layer signaling.

18. A wireless communication device, comprising:
    at least one processor configured to:
        insert a time gap between a first transmission and a second transmission according to a configuration from a wireless communication node, the configuration indicating the time gap to be inserted is determined by the wireless communication node based on a navigation signal,
        wherein the first transmission includes the wireless communication device transmitting a plurality of first uplink messages to the wireless communication node and the second transmission includes the wireless communication device transmitting a plurality of second uplink messages to the wireless communication node; and
        receive, during the time gap, the navigation signal; and
        determine, during the time gap, a value for timing adjustment or a value for frequency adjustment based on the navigation signal.

19. A wireless communication node, comprising at least one processor configured to implement the wireless communication method of claim 15.

\* \* \* \* \*